US012125423B2

United States Patent
(12) United States Patent
Kim et al.

(10) Patent No.: US 12,125,423 B2
(45) Date of Patent: Oct. 22, 2024

(54) DISPLAY DRIVING DEVICE

(71) Applicant: Silicon Works Co., Ltd., Daejeon (KR)

(72) Inventors: Young Bok Kim, Daejeon (KR); Wong Jong Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/351,009

(22) Filed: Jun. 17, 2021

(65) Prior Publication Data

US 2021/0398470 A1 Dec. 23, 2021

(30) Foreign Application Priority Data

Jun. 19, 2020 (KR) ........................ 10-2020-0074703

(51) Int. Cl.
*G09G 3/20* (2006.01)
*G09G 5/00* (2006.01)

(52) U.S. Cl.
CPC ............... *G09G 3/20* (2013.01); *G09G 5/008* (2013.01); *G09G 2310/0275* (2013.01); *G09G 2330/028* (2013.01); *G09G 2330/08* (2013.01); *G09G 2330/12* (2013.01)

(58) Field of Classification Search
CPC .. G09G 3/20; G09G 5/008; G09G 2310/0275; G09G 2330/028; G09G 2330/08; G09G 2330/12
See application file for complete search history.

(56) References Cited

U.S. PATENT DOCUMENTS 6,791,369 B1 * 9/2004 Hattori .................. G06F 1/3203 327/63
9,136,801 B2 * 9/2015 Yamamoto .......... H04L 25/0278
2010/0045655 A1 * 2/2010 Jang ......................... G09G 3/20 345/213
2010/0166128 A1 * 7/2010 Jang .................... H04L 25/0292 375/354
2011/0267022 A1 * 11/2011 Hong .................. H04L 25/0272 323/299
2017/0229088 A1 * 8/2017 Wang ................... G09G 3/3648
2021/0201757 A1 * 7/2021 Kim ..................... G09G 3/3225

FOREIGN PATENT DOCUMENTS

KR 10-2012-0065169 A 6/2012
KR 2020-0007283 A 1/2020
WO WO-2008032895 A1 * 3/2008 ......... H03F 3/45179

OTHER PUBLICATIONS

Korean Office Action dated Aug. 21, 2024 issued in Patent Application No. 10-2020-0074703 w/English Translation (13 pages).

* cited by examiner

*Primary Examiner* — Patrick N Edouard
*Assistant Examiner* — Eboni N Giles
(74) *Attorney, Agent, or Firm* — POLSINELLI PC

(57) ABSTRACT

The present disclosure discloses a display driving device insensitive to external noise. The display driving device may include first and second data wires configured to connect a transmitter of a timing controller and a receiver of a source driver, first and second terminating resistors configured to connect the first and second data wires, and a noise reduction circuit configured to detect a lock fail, generate a common voltage when detecting the lock fail, and provide the common voltage to a node between the first and second terminating resistors. The display driving device can prevent an image failure by minimizing the influence of external noise.

13 Claims, 5 Drawing Sheets

DISPLAY DRIVING DEVICE

BACKGROUND

1. Technical Field

The present disclosure relates to a display device, and more particularly, to a display driving device capable of preventing an image failure by minimizing the influence of external noise.

2. Related Art

In general, a display device may include a display panel, a gate driver, a source driver, a timing controller, etc. The timing controller may provide image data to the source driver. The source driver may provide the display panel with source signals corresponding to the image data.

The timing controller and the source driver may be connected through a pair of data wires. For impedance matching, a terminating resistor may be disposed at the termination of the data wire.

The timing controller may transmit, to the source driver, input data having a packet form and including a clock, image data and control data through the data wires. The source driver may recover the clock, the image data and the control data from the input data.

However, if external noise acts on the pair of data wires in common, a level of a common voltage formed in the terminating resistor may be changed. If the level of the common voltage is changed due to the external noise, a level of the input data may deviate from an input range of a receiver of the source driver. As a result, there is a problem in that the source driver does not recover the clock, the image data and the control data normally from the input data.

Accordingly, there is a need for a technique capable of minimizing the influence of external noise on a common voltage.

SUMMARY

Various embodiments are directed to providing a display driving device capable of preventing an image failure by minimizing the influence of external noise.

In an embodiment, a display driving device may include first and second data wires configured to connect a transmitter of a timing controller and a receiver of a source driver, first and second terminating resistors configured to connect the first and second data wires, and a noise reduction circuit configured to detect a lock fail in response to a clock signal, generate a common voltage when detecting the lock fail, and supply the common voltage to a node between the first and second terminating resistors.

A display driving device may include first and second data wires configured to connect a transmitter of a timing controller and a receiver of a source driver, first and second terminating resistors configured to connect the first and second data wires, and a noise reduction circuit configured to detect a lock fail in response to a clock signal, determine whether the detected lock fail satisfies a preset condition, generate a common voltage when the detected lock fail satisfies the preset condition, and supply the common voltage to a node between the first and second terminating resistors.

A display driving device may include first and second data wires configured to connect a transmitter of a timing controller and a receiver of a source driver, first and second terminating resistors configured to connect the first and second data wires, and a voltage source configured to have one end connected to a node between the first and second terminating resistors.

According to embodiments, when a lock fail attributable to external noise is detected, a common voltage having a fixed level is supplied to a node between the first and second terminating resistors disposed between the first and second data wires. Therefore, a change in a level of input data attributable to the external noise can be minimized.

Furthermore, embodiments can prevent an image failure by minimizing the influence of external noise on a common voltage.

Furthermore, embodiments can minimize a change in a voltage level of a node attributable to external noise by connecting a capacitor to a node between the first and second terminating resistors and thus can prevent an image failure.

DETAILED DESCRIPTION

Embodiments disclose a display driving device capable of preventing an image failure by minimizing the influence of external noise.

In embodiments, a transmitter TX may be defined as a transmitter of a timing controller, which transmits, to a source driver, input data having a packet form and including a clock, image data and control data.

In embodiments, a receiver RX may be defined as a receiver of a source driver, which receives, from the timing controller, input data having a packet form and including a clock, image data and control data.

In embodiments, a protocol for transmitting input data, having a packet form and including a clock, image data and control data, through a pair of first and second data wires may be established in the timing controller. A protocol for recovering a clock, image data and control data from input data received through the pair of first and second data wires may be established in the source driver.

Figure 1:
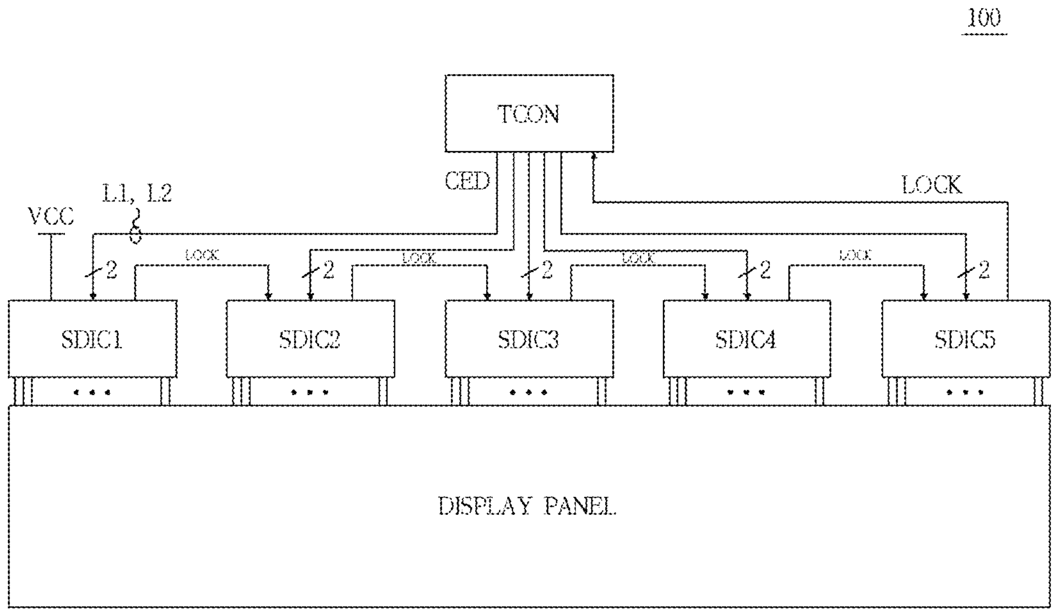
FIG. 1 is a block diagram of a display device according to an embodiment.

FIG. 1 is a block diagram of a display device 100 according to an embodiment.

Referring to FIG. 1, the display device 100 may include a display driving device and a display panel. The display driving device may include a timing controller TCON and a plurality of first to fifth source drivers SDIC1 to SDIC5. The number of source drivers of the display driving device may be determined by resolution of the display panel.

The timing controller TCON may be connected to the plurality of first to fifth source drivers SDIC1 to SDIC5 in a point-to-point manner through pairs of data wires L1 and L2. "L1" is denoted as a first data wire, and "L2" is denoted as a second data wire.

The timing controller TCON may provide input data CED to each of the source drivers SDIC1 to SDIC5 through each pair of data wires L1 and L2.

The first to fifth source drivers SDIC1 to SDIC5 are configured to transmit a lock signal LOCK through a lock link. The lock link means that the first to fifth source drivers SDIC1 to SDIC5 are sequentially cascade-connected in order to transmit the lock signal LOCK.

For example, each of the first to fifth source drivers SDIC1 to SDIC5 includes a lock signal input stage and a lock signal output stage. The first lock signal input stage of the first source driver SDIC1 may be connected to a power supply source terminal VCC. Furthermore, the lock signal output stage of the first source driver SDIC1 and the lock signal input stage of the second source driver SDIC2, the lock signal output stage of the second source driver SDIC2 and the lock signal input stage of the third source driver SDIC3, the lock signal output stage of the third source driver SDIC3 and the lock signal input stage of the fourth source driver SDIC4, and the lock signal output stage of the fourth source driver SDIC4 and the lock signal input stage of the fifth source driver SDIC5 may be interconnected. Furthermore, the last lock signal output stage of the fifth source driver SDIC5 may be connected to the timing controller TCON through a feedback link.

When a lock fail occurs in at least one of the first to fifth source drivers SDIC1 to SDIC5, the fifth source driver SDIC5 may provide the timing controller TCON with the lock signal LOCK having a logic level indicative of the lock fail.

For example, when a clock signal is stabilized through clock training, the first to fifth source drivers SDIC1 to SDIC5 may output the lock signal LOCK having a high logic level that means a normal lock state. Furthermore, when a lock fail is detected due to an unstable clock signal attributable to external noise or another cause, the first to fifth source drivers SDIC1 to SDIC5 may output the lock signal LOCK having a low logic level that means the lock fail.

For example, when receiving the lock signal LOCK having a high logic level from the fifth source driver SDIC5, the timing controller TCON may provide the first to fifth source drivers SDIC1 to SDIC5 with the input data CED including a clock, image data and control data.

Furthermore, when receiving the lock signal LOCK having a low logic level from the fifth source driver SDIC5, the timing controller TCON may provide the first to fifth source drivers SDIC1 to SDIC5 with the input data CED including a clock training pattern for setting a clock.

Figure 2:
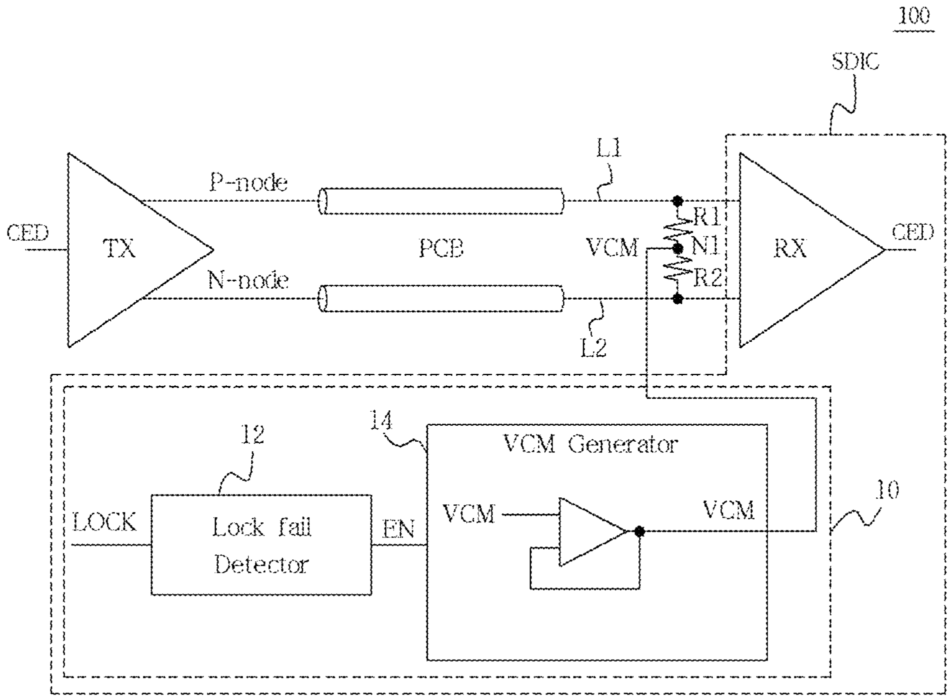
FIG. 2 is a block diagram of the display device including a source driver according to a first embodiment.

FIG. 2 is a block diagram of the display device 100 including a source driver SDIC according to a first embodiment.

Referring to FIG. 2, the display device 100 may include a transmitter TX of the timing controller TCON and the source driver SDIC.

The source driver SDIC may include a receiver RX and a noise reduction circuit 10.

The transmitter TX of the timing controller TCON and the receiver RX of the source driver SDIC may be connected through the pair of first and second data wires L1 and L2.

Furthermore, a first terminating resistor R1 may be configured at the termination of the first data wire L1. A second terminating resistor R2 may be configured at the termination of the second data wire L2. The first terminating resistor R1 and the second terminating resistor R2 are connected through a node N1. That is, the first terminating resistor R1 and the second terminating resistor R2 may be connected in series between the first and second data wires L1 and L2.

In this case, for impedance matching, the first terminating resistor R1 may be configured to have the same resistance value as the first data wire L1. The second terminating resistor R2 may be configured to have the same resistance value as the second data wire L2. In FIG. 2, PCB means a printed circuit board on which the first terminating resistor R1 and the second terminating resistor R2 are printed.

The transmitter TX of the timing controller TCON may provide the input data CED to the receiver RX of the source driver SDIC through the first and second data wires L1 and L2. In this case, the input data CED may include a clock, image data and control data in a packet form.

The receiver RX of the source driver SDIC may receive the input data CED through the first and second data wires L1 and L2. The source driver SDIC may provide the input data CED to a clock recovery circuit (not illustrated) and a data recovery circuit (not illustrated).

For example, the clock recovery circuit may generate a sampling clock signal by recovering a clock from the input data CED based on a preset protocol, and may provide the sampling clock signal to the data recovery circuit.

The data recovery circuit may recover image data and control data from the input data CED by using the sampling clock signal.

The noise reduction circuit 10 may detect a lock fail by using the lock signal LOCK, may generate a common voltage VCM when detecting the lock fail, and may supply the common voltage VCM to the node N1 between the first terminating resistor R1 and the second terminating resistor R2.

The noise reduction circuit 10 may include a lock fail detector 12 and a VCM generator 14.

The lock fail detector 12 may receive the lock signal LOCK, may detect a lock fail in response to the lock signal LOCK, and may output an enable signal EN to the VCM generator 14 when detecting the lock fail.

For example, the lock signal LOCK may be received from another source driver through the lock link or may be generated in an internal circuit. In this case, when an abnormal communication state occurs due to external noise, the lock signal LOCK may be generated as a signal having a low logic level.

The VCM generator 14 may generate the common voltage VCM having a fixed level in response to the enable signal EN, and may provide the common voltage VCM to the node N1 between the first terminating resistor R1 and the second terminating resistor R2.

Furthermore, the VCM generator 14 may be disabled when a given time elapses after providing the common voltage VCM to the node N1 between the first terminating resistor R1 and the second terminating resistor R2.

The VCM generator 14 may be configured to include a buffer acting as a current source. The VCM generator 14 fixes a potential of the node N1 as the common voltage VCM, and acts as a current source for the first terminating resistor R1 and the second terminating resistor R2. Accordingly, although external noise influences the first terminating resistor R1 and the second terminating resistor R2, a change in a voltage applied to the first terminating resistor R1 and the second terminating resistor R2 can be suppressed by the VCM generator 14 that fixes the potential of the node N1 as the common voltage VCM and that acts as the current source providing a current path for external noise.

When a lock fail attributable to external noise occurs, the noise reduction circuit 10 configured as described above can minimize the influence of the external noise on the common voltage VCM by supplying the node N1 between the first terminating resistor R1 and the second terminating resistor R2 with the common voltage VCM that is internally generated and has a fixed level.

The first embodiment of FIG. 2 illustrates that the first terminating resistor R1 and the second terminating resistor R2 are disposed in the printed circuit board PCB, but the present disclosure is not limited thereto. The first terminating resistor R1 and the second terminating resistor R2 may be disposed within a chip of the source driver SDIC.

Figure 3:
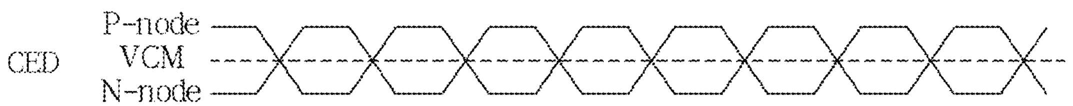
FIG. 3 is a waveform diagram of input data transmitted through a pair of data wires of FIG. 1.

FIG. 3 is a waveform diagram illustrating the input data CED transmitted through the pair of first and second data wires L1 and L2 of FIG. 1.

The input data CED may be applied to the first terminating resistor R1 and the second terminating resistor R2, and may be represented as a differential voltage that swings based on the common voltage VCM.

The receiver RX may be set to have a fixed input range.

When a lock fail attributable to external noise occurs, the noise reduction circuit 10 can minimize the influence of the external noise on the common voltage VCM by generating the common voltage VCM having a fixed level and supplying the common voltage VCM to the node N1 between the first terminating resistor R1 and the second terminating resistor R2.

As described above, the noise reduction circuit 10 can minimize the influence of external noise on the common voltage VCM. The input data CED may swing through the first terminating resistor R1 and the second terminating resistor R2 based on the common voltage VCM having a fixed level.

The source driver SDIC can recover a clock, image data and control data normally from the input data CED received as described above.

Figure 4:
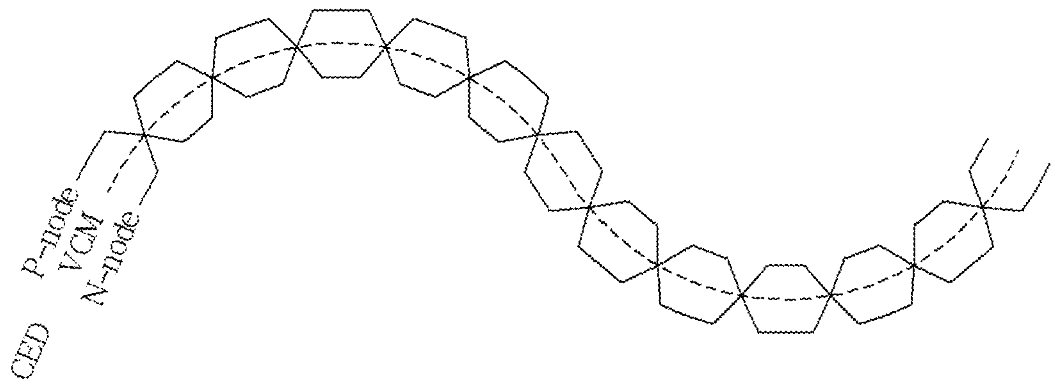
FIG. 4 is a waveform diagram illustrating that a level of input data is changed due to external noise.

FIG. 4 is a waveform diagram illustrating that a level of the input data CED is changed due to external noise.

For example, if the element of the noise reduction circuit 10 is not present and common noise occurs in a positive node P_NODE of the first data wire L1 and a negative node N_NODE of the second data wire L2, a level of the common voltage VCM may be changed due to the common noise, and a swing range of the input data CED may deviate from an input range of the receiver RX of the source driver SDIC.

In such a case, the source driver SDIC cannot recover a clock, image data and control data normally from the input data CED that deviates from the input range.

However, the source driver SDIC according to the present embodiment includes the noise reduction circuit 10. Therefore, when common noise occurs in the positive node P-NODE of the first data wire L1 and the negative node N-NODE of the second data wire L2, the common voltage VCM having a fixed level is supplied to the node N1 between the first terminating resistor R1 and the second terminating resistor R2, and the influence of external noise on the common voltage VCM can be minimized.

Figure 5:
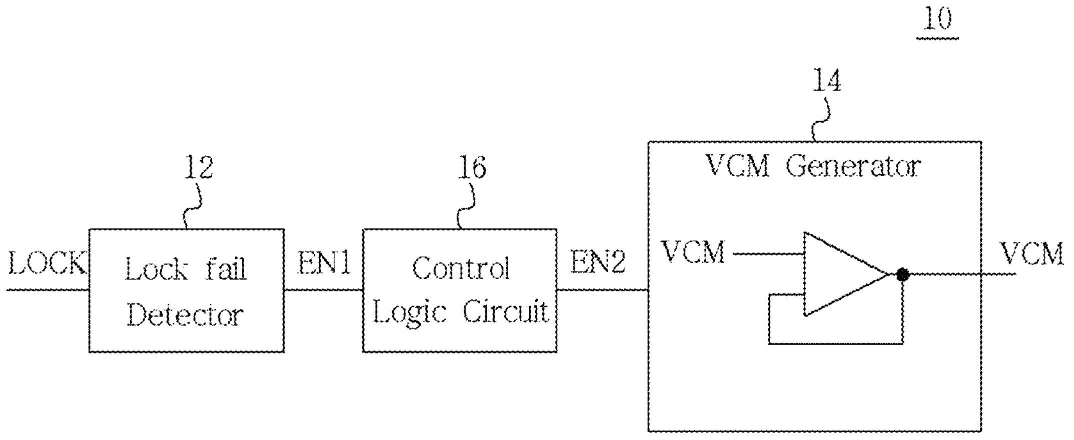
FIG. 5 is a block diagram of a noise reduction circuit of the source driver according to another embodiment.

FIG. 5 is a block diagram of the noise reduction circuit 10 of the source driver SDIC according to another embodiment.

Referring to FIG. 5, the noise reduction circuit 10 may include the lock fail detector 12, a control logic circuit 16 and the VCM generator 14.

The lock fail detector 12 may receive the lock signal LOCK, may detect a lock fail in response to the lock signal LOCK, and may output, to the control logic circuit 16, a first enable signal EN1 corresponding to the lock fail.

For example, the lock signal LOCK may be provided by another source driver through the lock link or may be generated in an internal circuit. In this case, when an abnormal communication state occurs due to external noise, the lock signal LOCK may be generated as a signal having a low logic level.

When a lock fail is detected by a reference number or more, the control logic circuit 16 may output a second enable signal EN2 to the VCM generator 14 in response to the first enable signal EN1.

The VCM generator 14 may generate the common voltage VCM in response to the second enable signal EN2, and may provide the common voltage VCM to the node N1 between the first terminating resistor R1 and the second terminating resistor R2.

Furthermore, the VCM generator 14 may be disabled when a given time elapses after providing the common voltage VCM to the node N1 between the first terminating resistor R1 and the second terminating resistor R2.

When a lock fail attributable to external noise is detected by a reference number or more, the noise reduction circuit 10 configured as described above can minimize the influence of the external noise on the common voltage VCM by generating the common voltage VCM and supplying the common voltage VCM to the node N1 between the first terminating resistor R1 and the second terminating resistor R2.

If a lock fail is maintained for a reference time or more after a lock fail attributable to external noise is detected, the noise reduction circuit 10 according to another embodiment may generate the common voltage VCM and supply the common voltage VCM to the node N1 between the first terminating resistor R1 and the second terminating resistor R2.

The noise reduction circuit 10 may include the lock fail detector 12, the control logic circuit 16 and the VCM generator 14.

The lock fail detector 12 may receive the lock signal LOCK, may detect a lock fail in response to the lock signal LOCK, and may output the first enable signal EN1 to the control logic circuit 16 when detecting the lock fail.

If the lock fail is maintained for the reference time or more after the lock fail is detected, the control logic circuit 16 may output the second enable signal EN2 to the VCM generator 14 in response to the first enable signal EN1.

The VCM generator 14 may generate the common voltage VCM in response to the second enable signal EN2, and may provide the common voltage VCM to the node N1 between the first terminating resistor R1 and the second terminating resistor R2.

As described above, the noise reduction circuit 10 may detect a lock fail, may determine whether the detected lock fail satisfies a preset condition, may generate the common voltage VCM when the detected lock fail satisfies the preset condition, and may supply the common voltage VCM to the node N1 between the first terminating resistor R1 and the second terminating resistor R2.

In this case, the preset condition may be set as a condition in which the lock fail is detected by a reference number or more or a condition in which the lock fail is maintained for a reference time or more.

As described above, when a lock fail is detected due to external noise and the detected lock fail satisfies the preset condition, the display driving device according to embodiments can minimize a change in a level of the input data CED by supplying the common voltage VCM to the node N1 between the first terminating resistor R1 and the second terminating resistor R2 which are formed between the first and second data wires L1 and L2.

Furthermore, embodiments can prevent an image failure by minimizing the influence of external noise on the common voltage VCM.

Figure 6:
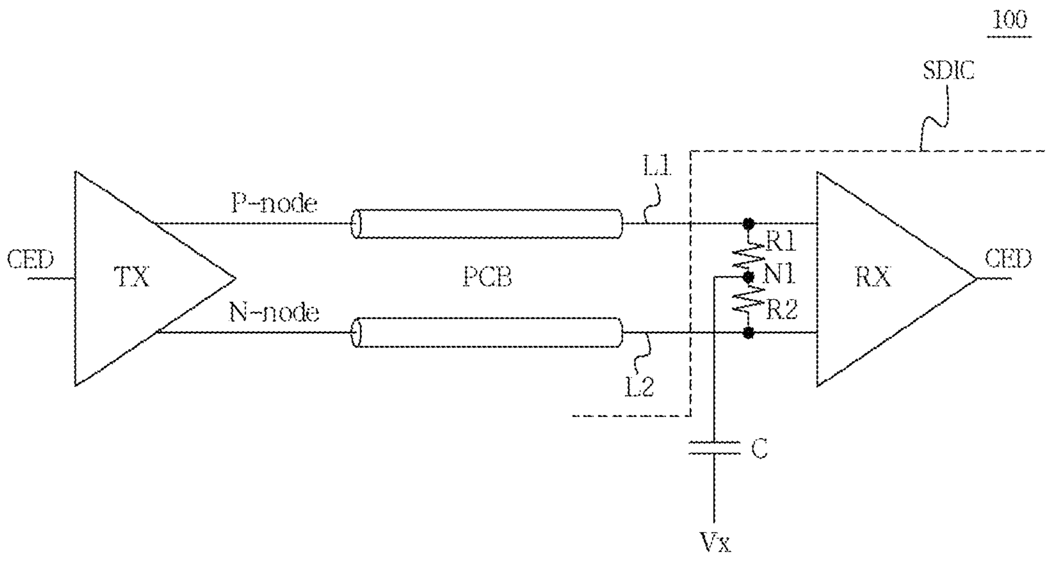
FIG. 6 is a block diagram of the display device including a source driver according to a second embodiment.

FIG. 6 is a block diagram of the display device 100 including a source driver SDIC according to a second embodiment.

Referring to FIG. 6, the source driver SDIC according to the second embodiment may include the receiver RX, the first terminating resistor R1, the second terminating resistor R2 and a capacitor C.

The receiver RX may be connected to the transmitter TX of the timing controller through the first and second data wires L1 and L2.

The first terminating resistor R1 and the second terminating resistor R2 may be disposed within a chip of the source driver SDIC. The first terminating resistor R1 and the second terminating resistor R2 may be connected in series between the first and second data wires L1 and L2.

The capacitor C may have one end connected to the node N1 between the first terminating resistor R1 and the second terminating resistor R2, and may have the other end connected to a terminal to which an external voltage Vx is applied. The external voltage Vx may have a fixed level.

The transmitter TX of the timing controller TCON may provide the input data CED to the receiver RX of the source driver SDIC through the first and second data wires L1 and L2.

Figure 7:
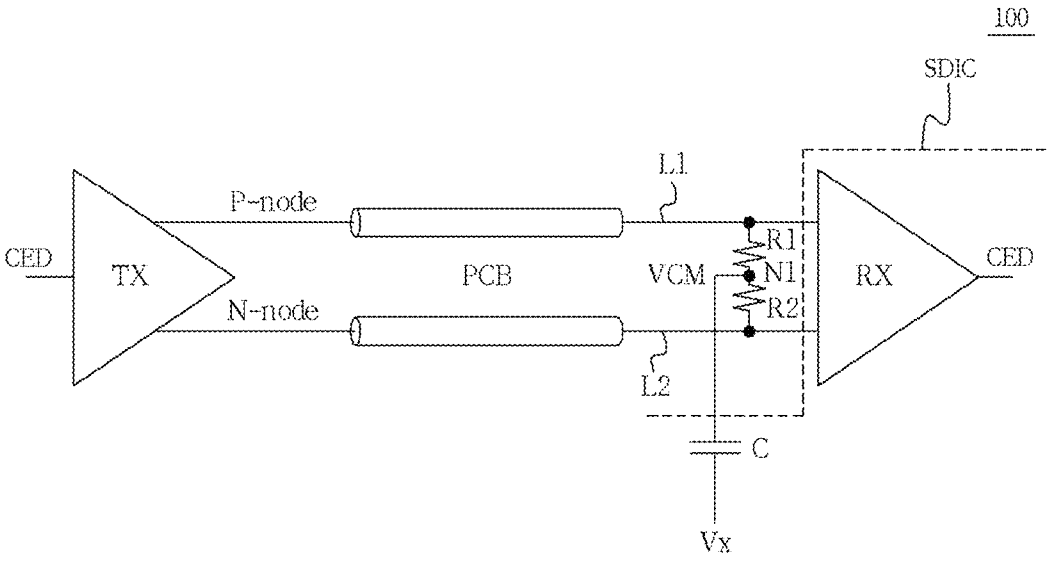
FIG. 7 is a block diagram of the display device including a source driver according to a third embodiment.

FIG. 7 is a block diagram of the display device 100 including a source driver SDIC according to a third embodiment.

Referring to FIG. 7, the source driver SDIC according to the third embodiment may include the receiver RX and the capacitor C.

The receiver RX may be connected to the transmitter TX of the timing controller through the first and second data wires L1 and L2.

In this case, the first terminating resistor R1 and the second terminating resistor R2 connected in series may be connected between the first and second data wires L1 and L2. The first terminating resistor R1 and the second terminating resistor R2 may be disposed in the printed circuit board PCB.

The capacitor C may have one end connected to the node N1 between the first terminating resistor R1 and the second terminating resistor R2 which are disposed in the printed circuit board PCB, and may have the other end connected to the terminal to which the external voltage Vx is applied.

The capacitor C may act as a voltage source for the first terminating resistor R1 and the second terminating resistor R2. Accordingly, although external noise influences the first terminating resistor R1 and the second terminating resistor R2, a change in a voltage applied to the first terminating resistor R1 and the second terminating resistor R2 can be suppressed by a buffering role of the capacitor C.

The embodiments of FIGS. 6 and 7 can minimize the influence of external noise on the common voltage VCM by the capacitor C and the external voltage Vx.

Figure 8:
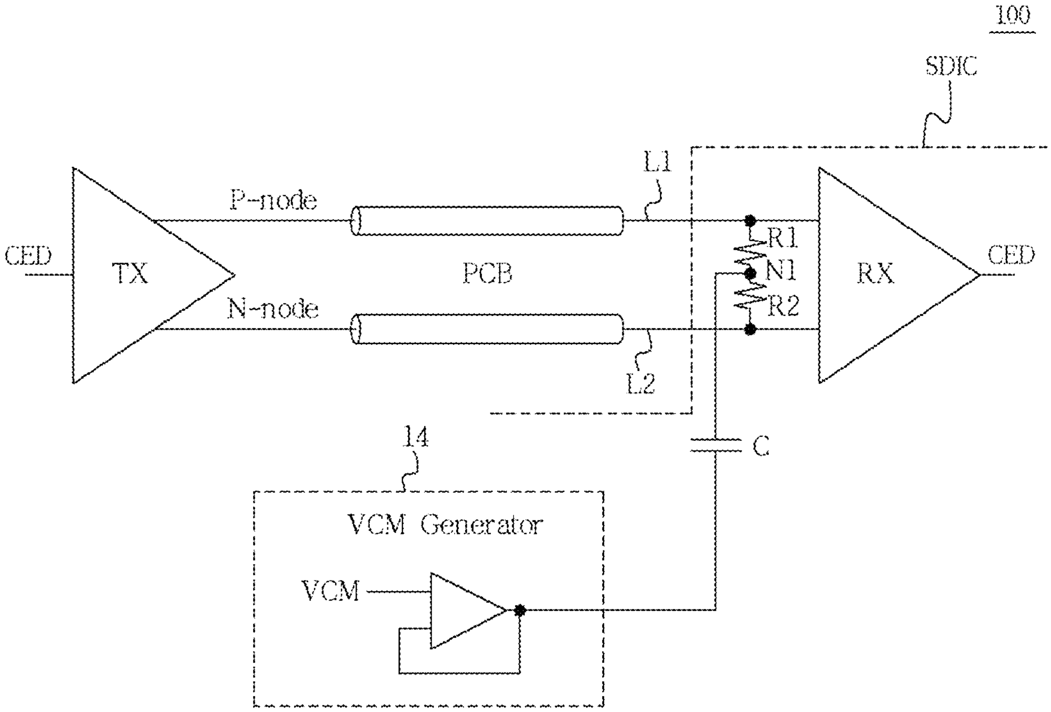
FIG. 8 is a block diagram of the display device including a source driver according to a fourth embodiment.

FIG. 8 is a block diagram of the display device 100 including a source driver SDIC according to a fourth embodiment.

Referring to FIG. 8, the source driver SDIC according to the fourth embodiment may include the receiver RX, the first terminating resistor R1, the second terminating resistor R2, the capacitor C and the VCM generator 14.

The receiver RX may be connected to the transmitter TX of the timing controller through the first and second data wires L1 and L2.

The first terminating resistor R1 and the second terminating resistor R2 may be disposed within a chip of the source driver SDIC, and may be connected in series between the first and second data wires L1 and L2.

The capacitor C may have one end connected to the node N1 between the first terminating resistor R1 and the second terminating resistor R2, and may have the other end connected to the VCM generator 14. The VCM generator 14 may generate the common voltage VCM having a fixed level, and may provide the common voltage VCM to the other end of the capacitor C.

The embodiment of FIG. 8 can minimize the influence of external noise on the common voltage VCM by the capacitor C and the common voltage VCM.

Figure 9:
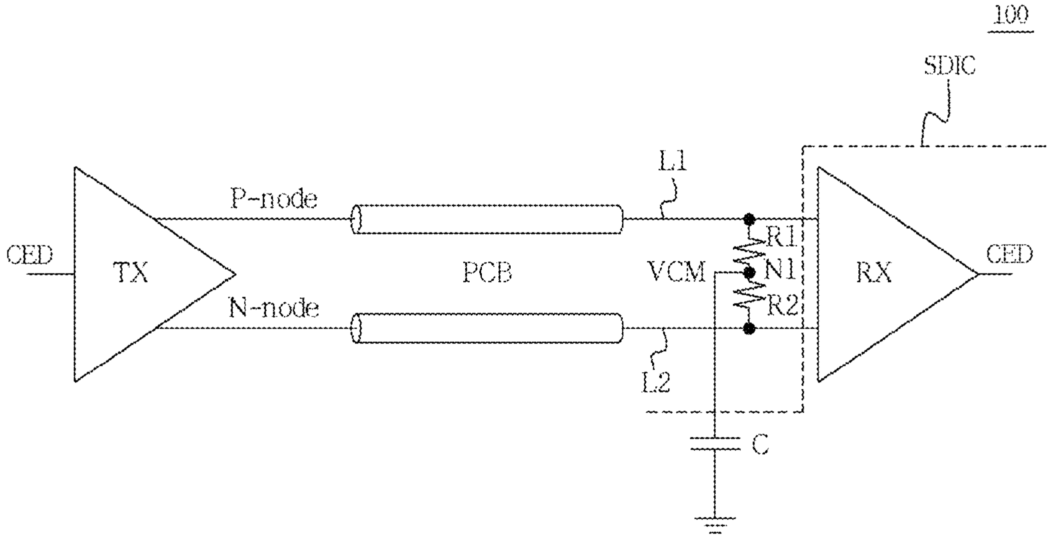
FIG. 9 is a block diagram of the display device including a source driver according to a fifth embodiment.

FIG. 9 is a block diagram of the display device 100 including a source driver SDIC according to a fifth embodiment.

Referring to FIG. 9, the source driver SDIC according to the fifth embodiment may include the receiver RX and the capacitor C.

The receiver RX may be connected to the transmitter TX of the timing controller through the first and second data wires L1 and L2.

In this case, the first terminating resistor R1 and the second terminating resistor R2 connected in series may be connected between the first and second data wires L1 and L2. The first terminating resistor R1 and the second terminating resistor R2 may be disposed in the printed circuit board PCB.

The capacitor C may have one end connected to the node N1 between the first terminating resistor R1 and the second terminating resistor R2 which are disposed in the printed circuit board PCB, and may have the other end connected to a terminal to which a ground voltage is applied.

The embodiment of FIG. 9 can minimize the influence of external noise on the common voltage by the capacitor C to which the ground voltage is applied.

As described above, the second to fifth embodiments can minimize a change in a voltage level of the node N1 attributable to external noise by connecting the capacitor to the node N1 between the first terminating resistor R1 and the second terminating resistor R2, and thus can prevent an image failure.

What is claimed is:

1. A display driving device comprising:

a first data wire and a second data wire connected to differential outputs of a transmitter of a timing controller and differential inputs of a receiver of a source driver;

an impedance matching element having a first end coupled to the first data wire and a second end coupled to the second data wire, the impedance matching element comprising a first terminating resistor in series with a second terminating resistor; and a noise reduction circuit configured to detect a lock fail in response to a clock signal, generate a common voltage having a fixed level when detecting the lock fail, and supply the common voltage to a node between the first terminating resistor and the second terminating resistor, wherein the common voltage suppresses a noise at the differential inputs of the receiver of the source driver between the first data wire and the second data wire, wherein the noise reduction circuit comprises:

a lock fail detector configured to receive a lock signal corresponding to the clock signal, detect the lock fail in response to the lock signal, and output an enable signal when detecting the lock fail; and a common voltage generator configured to generate the common voltage in response to the enable signal and provide the common voltage to the node between the first and second terminating resistors, wherein an input data is applied to the first terminating resistor and the second terminating resistor, and is represented as a differential voltage that swings based on the common voltage.

2. The display driving device of claim 1, wherein the common voltage generator is disabled when a given time elapses after providing the common voltage to the node between the first and second terminating resistors.

3. The display driving device of claim 1, wherein the first and second terminating resistors have resistance values identical with resistance values of the first and second data wires, respectively.

4. The display driving device of claim 1, wherein the first and second terminating resistors are disposed between a termination of the first data wire and a termination of the second data wire and are connected in series.

5. A display driving device comprising:

a first data wire and a second data wire connecting differential outputs of a transmitter of a timing controller and differential inputs of a receiver of a source driver;

an impedance matching element having a first end coupled to the first data wire and a second end coupled to the second data wire, the impedance matching element comprising a first terminating resistor in series with a second terminating resistor; and a noise reduction circuit configured to detect a lock fail in response to a clock signal, determine whether the lock fail satisfies a preset condition, generate a common voltage having a fixed level when the lock fail satisfies the preset condition, and supply the common voltage to a node between the first terminating resistor and the second terminating resistor, wherein the common voltage suppresses a noise at the differential inputs of the receiver of the source driver between the first data wire and the second data wire, wherein the noise reduction circuit comprises:

a lock fail detector configured to receive a lock signal corresponding to the clock signal, detect the lock fail in response to the lock signal, and output a first enable signal when detecting the lock fail;

a control logic circuit configured to output a second enable signal in response to the first enable signal; and a common voltage generator configured to generate the common voltage in response to the second enable signal and provide the common voltage to the node between the first and second terminating resistors, wherein an input data is applied to the first terminating resistor and the second terminating resistor, and is represented as a differential voltage that swings based on the common voltage.

6. The display driving device of claim 5, wherein the noise reduction circuit generates the common voltage when the lock fail is detected by a reference number or more and supplies the common voltage to the node between the first and second terminating resistors.

7. The display driving device of claim 5, wherein the noise reduction circuit generates the common voltage when the lock fail is maintained for a reference time or more after the lock fail is detected, and supplies the common voltage to the node between the first and second terminating resistors.

8. The display driving device of claim 5, wherein the control logic circuit outputs the second enable signal in response to the first enable signal when the lock fail is detected by a reference number or more.

9. The display driving device of claim 5, wherein the control logic circuit outputs the second enable signal in response to the first enable signal when the lock fail is maintained for a reference time or more.

10. The display driving device of claim 9, wherein the common voltage generator is disabled when a given time elapses after providing the common voltage to the node between the first and second terminating resistors.

11. A display driving device comprising:

a first data wire and a second data wire connecting differential outputs of a transmitter of a timing controller and differential inputs of a receiver of a source driver;

an impedance matching element having a first end coupled to the first data wire and a second end coupled to the second data wire, the impedance matching element comprising a first terminating resistor in series with a second terminating resistor;

a voltage source connected to one end connected to a node between the first terminating resistor and the second terminating resistor and configured to apply a common voltage that suppresses a noise at the differential inputs of the receiver of the source driver between the first data wire and the second data wire;

a common voltage generator configured to generate the common voltage and provide the common voltage to the terminal to which the common voltage is applied; and a lock fail detector configured to receive a lock signal corresponding to a clock signal, detect a lock fail in response to the lock signal, and output a first enable signal when detecting the lock fail; and a noise reduction circuit configured suppress the noise at the differential inputs of the receiver of the source driver between the first data wire and the second data wire using the common voltage based on the lock fail, wherein the voltage source comprises a capacitor and the capacitor has the other end connected to the terminal to which an external voltage having a fixed level is applied, wherein an input data is applied to the first terminating resistor and the second terminating resistor, and is represented as a differential voltage that swings based on the common voltage.

12. The display driving device of claim 11, wherein the common voltage having the fixed level is applied as the external voltage.

13. The display driving device of claim 11, wherein the capacitor has the other end connected to the terminal to which a ground voltage is applied as the external voltage.

* * * * *